(12) United States Patent
Dean, Jr. et al.

(10) Patent No.: US 8,337,095 B2
(45) Date of Patent: Dec. 25, 2012

(54) TAPERED-CHANNEL FERRULES AND OPTICAL FIBER CONNECTORS EMPLOYING SAME

(75) Inventors: David L. Dean, Jr., Hickory, NC (US); Alan J. Malanowski, Newton, NC (US); Jetta M. Pyatt, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 327 days.

(21) Appl. No.: 12/570,999

(22) Filed: Sep. 30, 2009

(65) Prior Publication Data

US 2011/0075973 A1    Mar. 31, 2011

(51) Int. Cl.
*G02B 6/36* (2006.01)
(52) U.S. Cl. ............................................ 385/84; 385/78
(58) Field of Classification Search ...................... 385/78, 385/84
See application file for complete search history.

(56) References Cited

U.S. PATENT DOCUMENTS

| | | | | |
|---|---|---|---|---|
| 4,818,059 A | * | 4/1989 | Kakii et al. ...................... | 385/65 |
| 5,920,670 A | | 7/1999 | Lee et al. ........................ | 385/78 |
| 5,975,770 A | * | 11/1999 | Yanagi et al. ................... | 385/78 |
| 6,074,577 A | * | 6/2000 | Katsura et al. ................ | 264/1.25 |
| 6,129,865 A | * | 10/2000 | Jeong et al. ................... | 264/1.25 |
| 7,121,733 B2 | * | 10/2006 | Hengelmolen et al. ......... | 385/78 |
| 7,452,137 B2 | | 11/2008 | Droege et al. ................... | 385/60 |
| 2002/0076168 A1 | * | 6/2002 | Suematsu et al. ............... | 385/80 |
| 2004/0161205 A1 | * | 8/2004 | Hengelmolen et al. ......... | 385/78 |
| 2009/0214164 A1 | | 8/2009 | Nakagawa ....................... | 385/78 |

FOREIGN PATENT DOCUMENTS

EP           1130435           9/2001

* cited by examiner

*Primary Examiner* — K. Cyrus Kianni

(57) ABSTRACT

Ferrules having at least one tapered fiber channel that supports at least one optical fiber are disclosed. The at least one tapered fiber channel is defined by at least one channel wall. The material making up the channel wall is at least one of deformable and removable by forcible contact by the at least one optical fiber when the optical fiber is inserted into the fiber channel. This results in the formation of an interference fit between the front channel end and the optical fiber end when the diameter of the optical fiber end exceeds the diameter of the channel front end. The fiber channel wall may optionally include at least one deformable and/or removable-by-contact protrusion, with the at least one protrusion preferably being located in the channel section adjacent the narrow front channel end. Methods of forming the ferrules are also disclosed. Single-fiber and multi-fiber optical fiber connectors that employ the ferrules are also disclosed.

8 Claims, 13 Drawing Sheets

TAPERED-CHANNEL FERRULES AND OPTICAL FIBER CONNECTORS EMPLOYING SAME

BACKGROUND

1. Field of the Disclosure

The present disclosure relates generally to optical fiber connectors, and in particular relates to ferrules having one or more tapered channels, and to optical fiber connectors employing such ferrules.

2. Technical Background

Optical fibers are widely used in a variety of applications, including the telecommunications industry in which optical fibers are employed in a number of telephony and data transmission applications. Due at least in part to the extremely wide bandwidth and the low noise operation provided by optical fibers, the use of optical fibers and the variety of applications in which optical fibers are used are continuing to increase. For example, optical fibers no longer serve as merely a medium for long distance signal transmission, but are being increasingly routed directly to the home or, in some instances, directly to a desk or other work location, and between or within telecommunication devices in a central office or an outdoor unit.

Optical fiber connectors are used in a variety of applications where a set of one or more optical fibers needs to be connected to an external device, such as another set of one or more optical fibers, a circuit board, or an apparatus adapted to receive and transmit light. For example, optical fiber cables require connectors adapted to connect to and link discrete segments of optical fibers, or to connect optical fiber ports where the optical fibers are terminated.

Optical fiber connectors typically use a ferrule having one or more fiber channels with a diameter sized to accommodate corresponding one or more optical fibers of a given diameter. Since the typical ferrule is rigid and non-deformable, the fiber channels cannot accommodate fibers that are even slightly larger than the channel size. This is problematic since optical fibers typically differ from their nominal target diameter due to manufacturing variability. By way of example, an optical fiber having a target (nominal) diameter of 0.1255 mm can have an actual diameter that varies between 0.1245 mm to 0.1265 mm. Consequently, for all such optical fibers to fit into a ferrule, the ferrule would have to have a diameter of the largest variation, i.e., of at least 0.1265 mm. However, this sizing of the fiber channel leaves gaps on each side of the optical fiber for all but the largest-diameter fibers, resulting in many loose-fit optical fibers. Such loose fits translate into unacceptably high insertion loss.

Thus, there is a need for a ferrule for an optical fiber connector that can accommodate one or more optical fibers that have varying diameters.

SUMMARY

An aspect of the disclosure is a ferrule for supporting at least one optical fiber having an end. The ferrule includes a ferrule body made of a material and having front and back ends and at least one tapered fiber channel defined by at least one channel wall. The fiber channel is open at the front and back ferrule body ends, with the fiber channel back end being larger than the fiber channel front end. In one case, the channel wall material is deformable when the optical fiber is inserted into the channel and presses up against the channel wall. In another case, the channel wall material is removable by forcible contact by the optical fiber when the optical fiber is inserted with force into the fiber channel. In yet another case, ferrule body material that defines the channel wall includes both the deformation and the material-removal properties. The net result is the formation of an interference fit between the front channel end and the optical fiber end when the diameter of the optical fiber end exceeds the diameter of the channel front end. The fiber channel wall may optionally include at least one deformable and/or removable-by-contact protrusion, with the at least one protrusion preferably being located in the channel section adjacent the fiber channel front end.

Another aspect of the disclosure is a ferrule for supporting at least one optical fiber having an end with a fiber-end diameter. The ferrule includes a ferrule body having front and back ends and is made of at least one of a thermoplastic and thermoset material. The ferrule body material is least one of deformable and removable by forcible contact by the optical fiber. The ferrule has at least one tapered fiber channel having a front end with front-end diameter, and a back end with a back-end diameter that is greater than the front-end diameter, and at least one channel wall. When the at least one optical fiber is inserted into the at least one tapered fiber channel, the at least one tapered fiber channel is at least one of deformed and material removed from the at least one channel wall by forcible contact with the optical fiber. This results in the fiber end forming an interference fit with the front channel end when the fiber-end diameter exceeds the diameter of the channel front-end diameter.

Another aspect of the disclosure is a method of forming a ferrule that supports at least one optical fiber having an end. The method includes providing a ferrule mold having a cavity, and inserting at least one tapered pin within the cavity. The tapered pin has an outside shape that corresponds to a desired tapered fiber channel for the ferrule. The method also includes adding at least one of a thermoplastic and thermoset molding material to the mold cavity to cover the at least one tapered pin. The method also includes allowing the molding material to cure to form a ferrule body around the at least one tapered pin, wherein the ferrule body is at least one of deformable and removable by contact by the optical fiber. The method further includes removing the at least one tapered pin from the cured molding material to form at least one tapered channel having a smaller front end and a larger back end.

It is to be understood that both the foregoing general description and the following detailed description present embodiments of the disclosure, and are intended to provide an overview or framework for understanding the nature and character of the disclosure as it is claimed. The accompanying drawings are included to provide further understanding of the disclosure, and are incorporated into and constitute a part of this specification. The drawings illustrate the various example embodiments of the disclosure and, together with the description, serve to explain the principals and operations of the disclosure.

DETAILED DESCRIPTION OF THE PRESENT EMBODIMENTS

Figure 1:
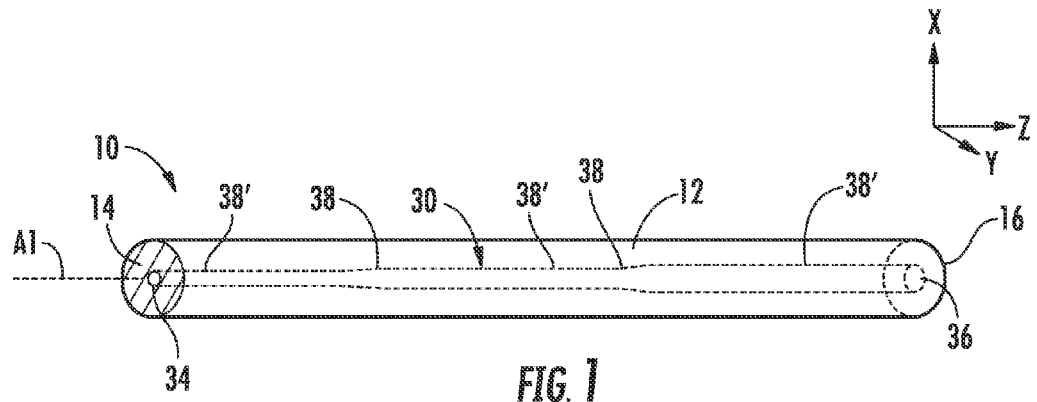
FIG. 1 is a perspective view of an example single-fiber ferrule having a tapered fiber channel (shown in phantom) with three straight sections joined by two short linearly tapered sections.

Reference is now made in detail to the present embodiments of the disclosure, examples of which are illustrated in the accompanying drawings. Whenever possible, identical or similar reference numerals or symbols are used throughout the drawings to refer to identical or similar parts. It should be understood that the embodiments disclosed herein are merely examples with each one incorporating certain benefits of the present disclosure. Various modifications and alterations may be made to the following examples within the scope of the present disclosure, and aspects of the different examples may be mixed in different ways to achieve yet further examples. Accordingly, the true scope of the disclosure is to be understood from the entirety of the present disclosure in view of, but not limited to the embodiments described herein.

In the discussion below, phrase "removable by forcible contact" means that some of the material making the portion of ferrule body 12 that serves to define channel wall 31 is removed by the optical fiber by one or more of scratching, digging, scrapping, abrading, scoring, etc., the less-hard ferrule body material. This material removal process is enhanced by providing optical fiber 50 with a relative sharp edge 55 at fiber front end 54, as discussed below with respect to FIGS. 14 and 15.

FIG. 1 is a perspective view of an example single-fiber ferrule 10 having a ferrule body 12 with a front end 14, a back end 16 and a central axis A1. Cartesian coordinates are provided for the sake of reference. Ferrule body includes a fiber channel 30 defined by at least one channel wall 31. Fiber channel 30 has open front and back ends 34 and 36 with respective diameters $D_{34}$ and $D_{36}$, where $D_{34} < D_{36}$. Fiber channel 30 is tapered, with channel wall(s) 31 being linearly sloped, curved, straight but with stepped sections, or a combination thereof. Fiber channel 30 may include one or more sections 38 having different tapers or no taper (i.e., "straight"). In an example embodiment, the lateral cross-section of fiber channel 30 is circular and includes a single cylindrical channel wall 31 for the given channel section.

Figure 2:
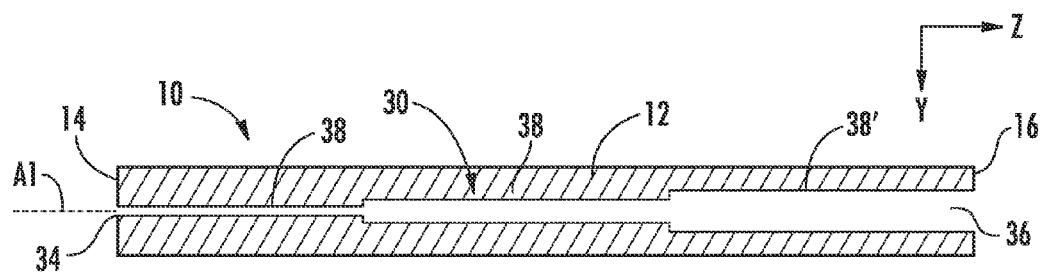
FIG. 2 is a longitudinal cross-sectional view of the ferrule of FIG. 1 as viewed in the Y-Z plane, but illustrating an example tapered fiber channel having a stepped taper with three straight (i.e., non-tapered) sections.

An example embodiment of tapered fiber channel 30 includes two or more straight or non-tapered sections 38', with adjacent straight channel sections connected by relatively short tapered sections 38, as illustrated in FIG. 1. FIG. 2 is a Y-Z cross-sectional view of an example ferrule 10 having three straight channel sections 38 of different diameters, where the transition between the sections is stepped rather than tapered. The overall fiber channel 30, however, is considered tapered, i.e., "step tapered."

In one example embodiment, fiber channel 30 includes a middle tapered section 38 about 1 mm long that connects to respective untapered front and back sections 38' of about 0.5 mm long. In an example embodiment, fiber channel diameter $D_{36}$ at fiber channel back end 36 is 0.1262 mm and fiber channel diameter $D_{34}$ at fiber channel front end 34 is 0.1252 mm. This example embodiment is illustrated in the Y-Z cross-sectional view shown in FIG. 3.

Figure 3:
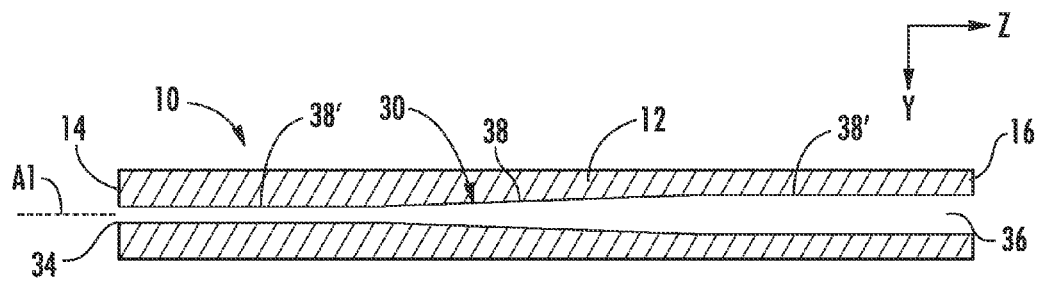
FIG. 3 is similar to FIG. 2, and illustrates an example tapered fiber channel having a central tapered section surrounded by two straight sections.
Figure 4:
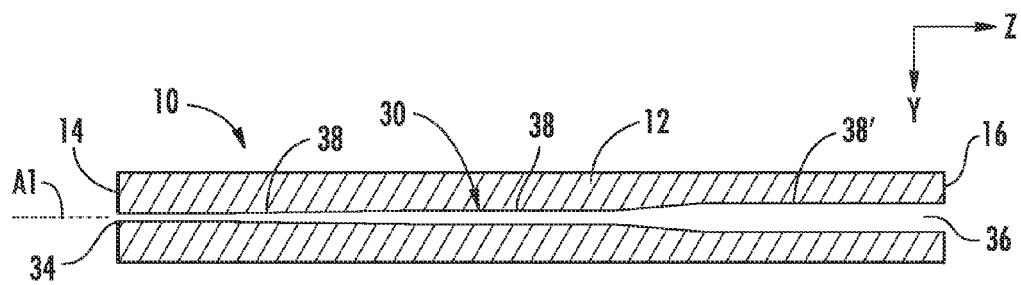
FIG. 4 is similar to FIG. 2, and illustrates an example tapered fiber channel having two front-most curved tapered sections and a back-most straight section.

FIG. 4 is a cross-sectional view similar to FIG. 3 of an example single-fiber ferrule 10 wherein the two fiber channel sections 38 closest to fiber channel front end 34 have a smooth, curved taper while the fiber channel section 38' closest to fiber channel back end 36 is straight.

Figure 5:
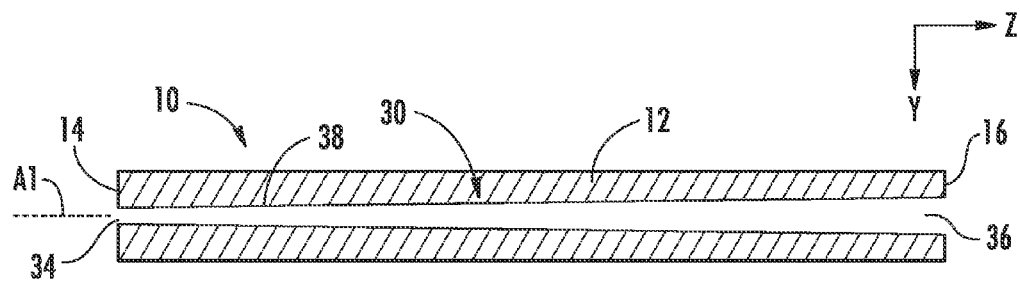
FIG. 5 is similar to FIG. 2, and illustrates an example of a linearly tapered fiber channel.
Figure 6:
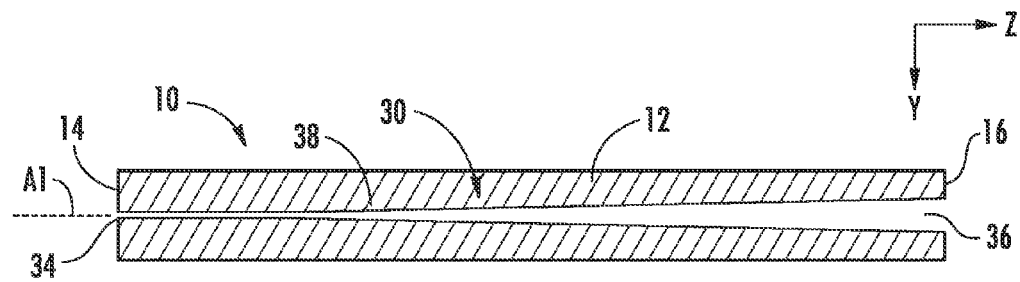
FIG. 6 is similar to FIG. 2 and illustrates an example of a curved tapered fiber channel.

FIG. 5 is similar to FIG. 4 and shows an example embodiment where fiber channel 30 includes a single linear taper. FIG. 6 is similar to FIG. 5 and shows an example embodiment of fiber channel 30 having a single curved taper. As will be appreciated, a variety of straight, curved or linearly sloped channel walls 31 or combinations thereof in one or more sections 38 and/or 38' can be used to form tapered fiber channel 30.

Figure 7:
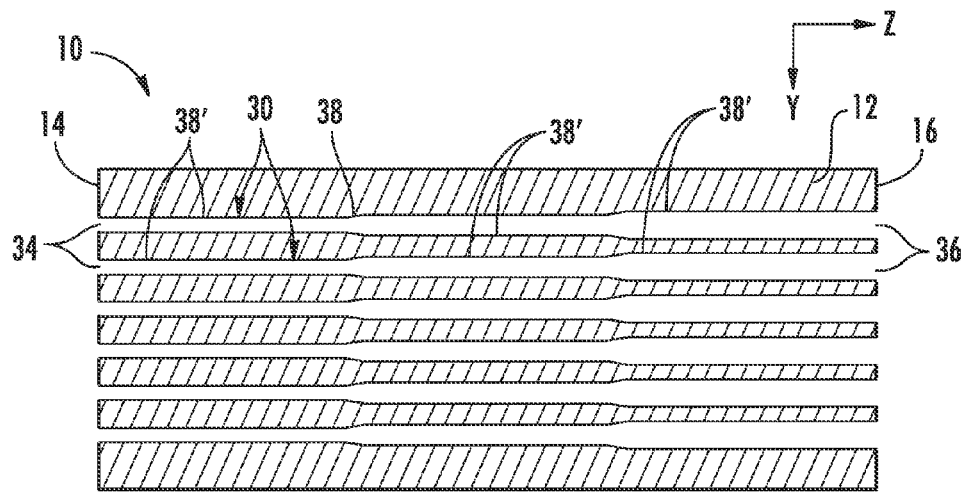
FIG. 7 is a longitudinal cross-sectional view of an example multifiber ferrule having multiple tapered fiber channels each having the configuration of the fiber channel of the single-channel ferrule of FIG. 1.

FIG. 7 is a top-down view of a multifiber ferrule 10 that includes multiple fiber channels 30 (shown in phantom)

formed in ferrule body 102, with each fiber channel the same as the fiber channel of the single-channel ferrule shown in FIG. 1.

Figure 8:
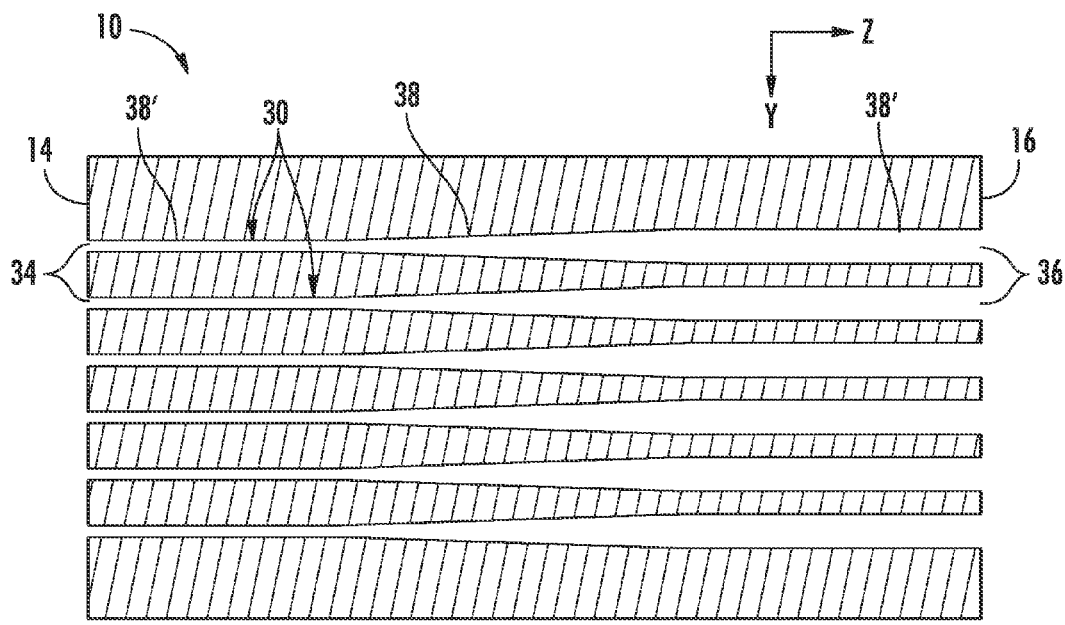
FIG. 8 is similar to FIG. 7, but with the fiber channels each having the configuration of the single-channel ferrule of FIG. 3.
Figure 9:
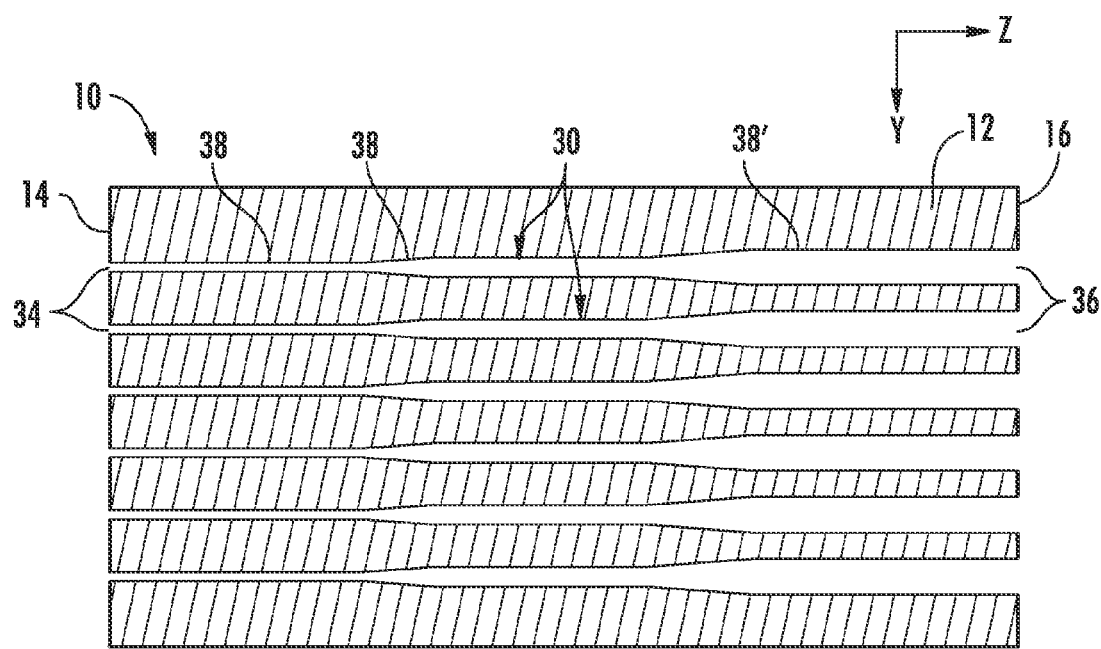
FIG. 9 is similar to FIG. 7, but with the fiber channels each having the configuration of the single-channel ferrule of FIG. 4.
Figure 10:
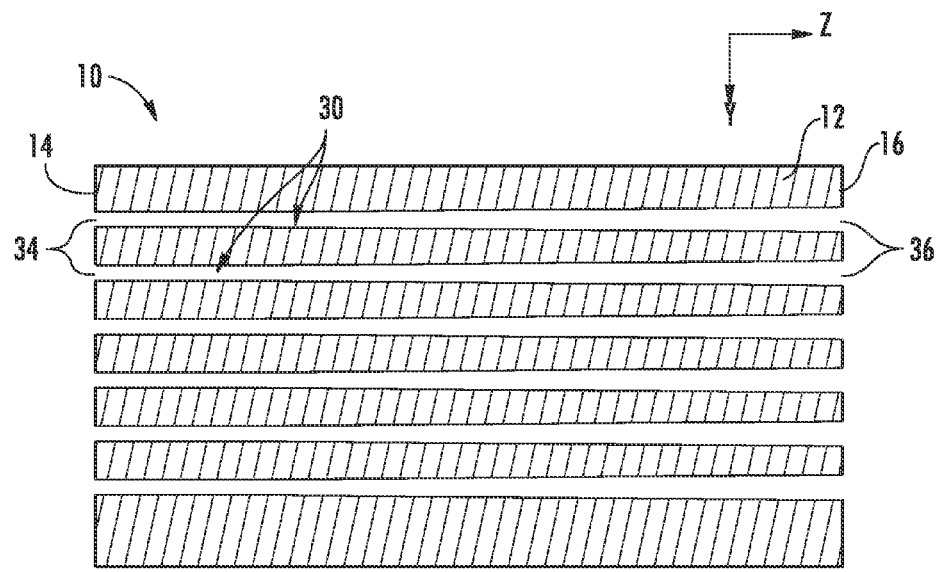
FIG. 10 is similar to FIG. 7, but with the fiber channels each having the configuration of the single-channel ferrule of FIG. 5.
Figure 11:
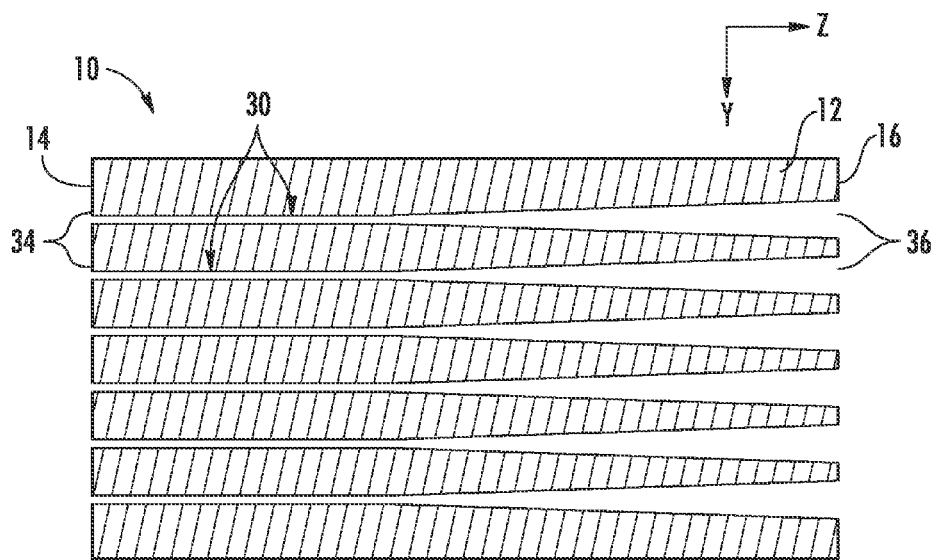
FIG. 11 is similar to FIG. 7, but with the fiber channels each having the configuration of the single-channel ferrule of FIG. 6.

FIG. 8 is a Y-Z cross-sectional view similar to top-down view of FIG. 3, and shows an example multifiber ferrule 10 that includes multiple fiber channels 30 each similar to the fiber channel shown in FIG. 3. FIG. 9 is a cross-sectional view similar to FIG. 7, and shows an example multifiber ferrule 10 that includes multiple fiber channels 30 each similar to the fiber channel shown in FIG. 4. FIG. 10 is a cross-sectional view similar to FIG. 7, and shows an example multifiber ferrule 10 that includes multiple fiber channels 30 each similar to the fiber channel shown in FIG. 5. FIG. 11 is a top down view similar to FIG. 7, and shows an example multifiber ferrule 10 that includes multiple fiber channels 30 each similar to the fiber channel shown in FIG. 6.

Ferrule Body Material

Figure 12:
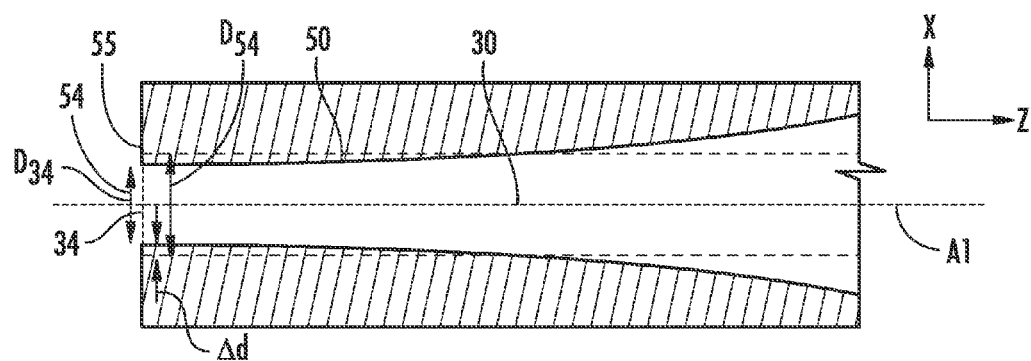
FIG. 12 is a close-up cross-sectional view of the front end of an example tapered fiber channel, also showing overlaid in phantom a front end of an optical fiber.
Figure 13:
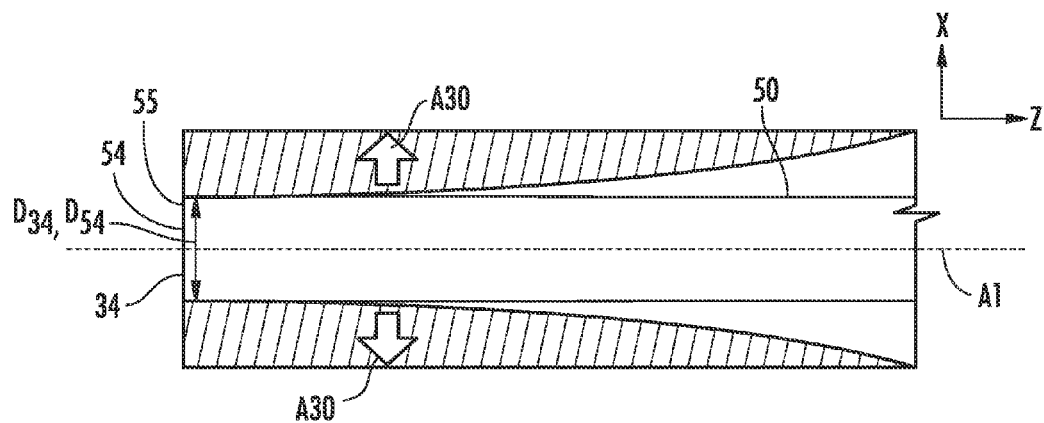
FIG. 13 is similar to FIG. 12, but shows the optical fiber inserted into tapered fiber channel with the fiber end tightly fitted into the fiber channel end.

In an example embodiment, ferrule body 12 of both the single-fiber-channel and multiple-fiber-channel embodiments of ferrule 10 is made of a material that is sufficiently deformable so that channel wall 31 deforms to accommodate an optical fiber with diameter $D_{54} > D_{34}$ when the optical fiber is inserted into a tapered fiber channel 30 (see FIGS. 12 and 13). This allows for optical fiber 50 at fiber end 54 to form a tight or "interference" fit at fiber channel end 34.

In another example embodiment, ferrule body 12 is made of a material that is removable by forcible contact with an optical fiber. The interference fit is formed by the optical fiber leading edge removing small amounts of the ferrule body material from ferrule channel wall 31 when the fiber it is inserted into the channel. Where there is a sufficient size difference between fiber end 54 and the diameter of fiber channel 30, the optical fiber needs to be forced into the channel. This force causes fiber outer edge 55 to remove material from channel wall 31.

In another example embodiment, the interference fit is accomplished by a combination of the material-deformation and material-removal effects. Note that inserting optical fiber 50 into fiber channel 30 will, in most cases, require the application of some degree of force so that the interference fit can be established at channel end 34, whether via one or both of the deformation and material-removal effects is/are involved. In an example embodiment where the optical fiber end diameter $D_{54}$ is only slightly larger than fiber channel end diameter $D_{34}$, it may happen that only deformation of the channel material occurs due to insufficient forcible contact of the optical fiber with channel wall 31.

An exemplary material for forming ferrule body 12 is a thermoplastic or thermoforming ("thermoset") molding compound. Example thermoplastic molding compounds are high-molecular-weight polymer that have a hardness (e.g., on the Shore hardness scale) less than that of an optical fiber. An exemplary thermoplastic molding compound includes, for example, a novolac epoxy resin with a modulus range from 22 to 25 Gpas. In an example embodiment, ferrule body 12 includes at least one of a thermoplastic material and a thermoset material.

FIG. 12 is a close-up cross-sectional view of the front end 34 of an example tapered fiber channel 30, also showing overlaid in phantom a front end 54 of an optical fiber 50. Optical fiber front end 54 includes an outer edge 55. The diameter $D_{54}$ of optical fiber end 54 is slightly greater than the diameter $D_{34}$ of fiber channel end 34 by an amount $\Delta d = D_{54} - D_{34}$. The difference between the diameters of fiber channel front end 34 and fiber end 54 can also be expressed in terms of a percentage, such as given by $\Delta D(\%) = 100*(\Delta d)/D_{54}$. In an example embodiment, $\Delta D(\%)$ is in the range $0 < \Delta D(\%) \leq 1\%$.

FIG. 13 is similar to FIG. 12, but shows optical fiber 50 inserted into tapered fiber channel 30 so that fiber end 54 tightly fits into fiber channel end 34. The tapered fiber channel 30 expands (as illustrated by arrows A30) to accommodate the larger optical fiber 54 to form the tight fit of fiber end 54 at fiber channel end 34. Note that the taper of fiber channel 30 facilitates the insertion of tapered fiber 50 into the fiber channel, and in particular into fiber channel front end 34.

Figure 14:
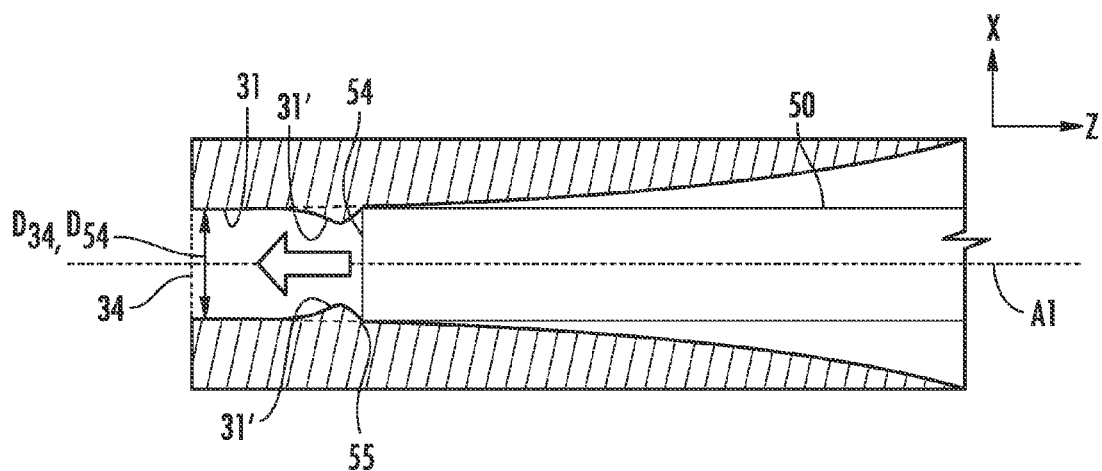
FIG. 14 is similar to FIG. 13, but shows the optical fiber edge removing material from the channel wall as the optical fiber passes through the channel.
Figure 15:
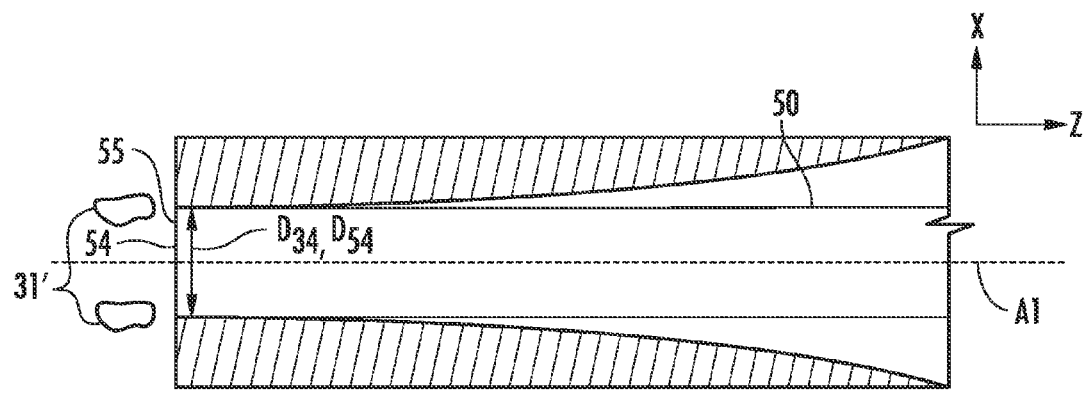
FIG. 15 is similar to FIG. 14, and shows the optical fiber with the fiber end at the front channel end and the material that was removed from walls being ejected from the front channel end as detritus, leaving an interference fit between the fiber end and the front channel end.

FIG. 14 is similar to FIG. 13, but illustrates an example embodiment wherein optical fiber 50 is inserted into fiber channel 30 and fiber outer edge 55 removes material 31' from channel wall 31 as the optical fiber moves through the channel. FIG. 15 is similar to FIG. 14 and shows optical fiber 50 with fiber end 54 at front channel end 34 and material 31' being removed from walls 31 being forced out as detritus from the front channel end by fiber 50, leaving an interference fit between fiber end 54 and front channel end 34.

Figure 16:
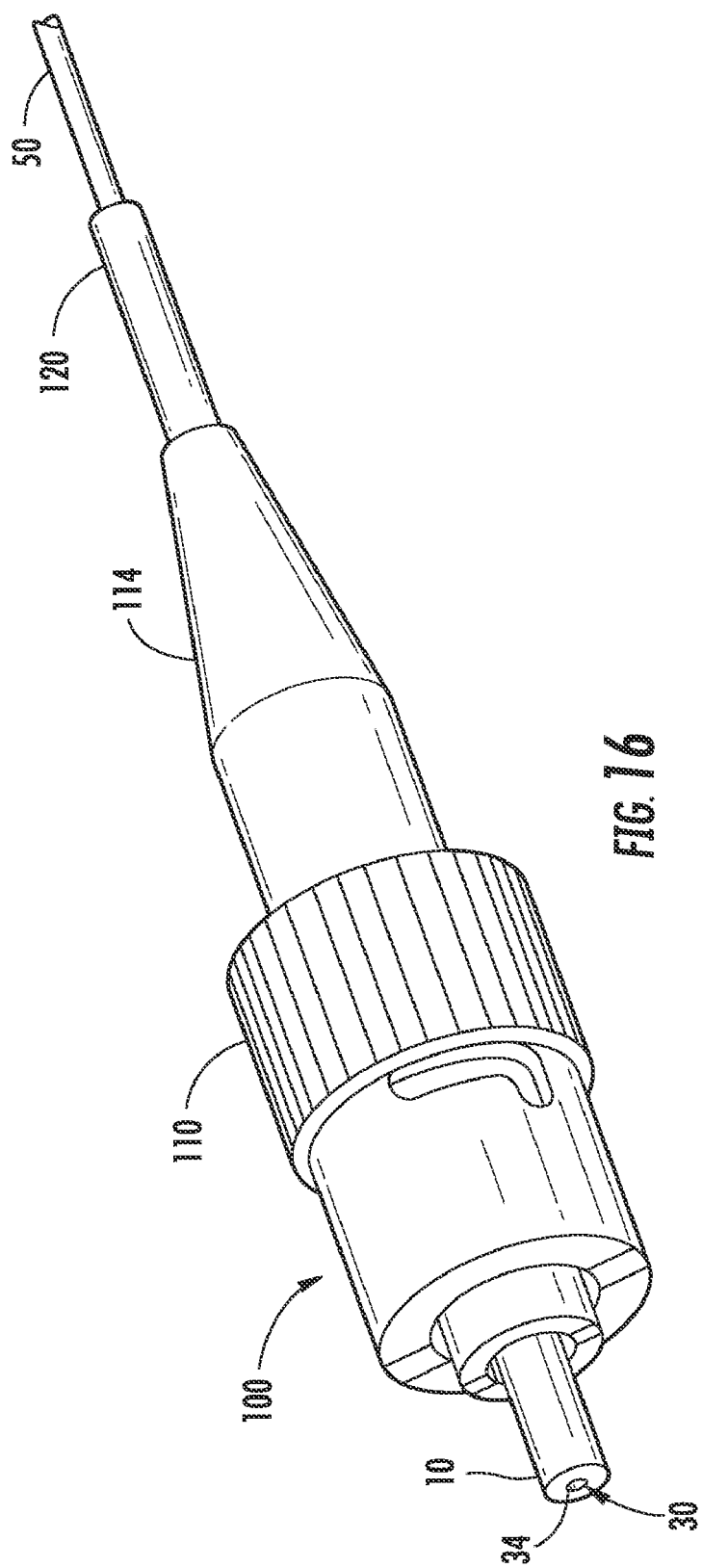
FIG. 16 is a perspective view of an example optical fiber connector that employs the single-fiber tapered ferrule.

FIG. 16 is a perspective view of an example single-fiber optical fiber connector 100 that employs the single-fiber ferrule 10 described above. Single-fiber connector 100 is shown as an "FC" type connector and includes a connector housing 110 and a strain-relief boot 114 that tapers down to a single-fiber optical fiber cable 120. Other types of single-fiber connectors 100, such as SC and LC connectors, can also be so formed. Connector housing 110 at least partially surrounds single-fiber ferrule 10.

Figure 17:
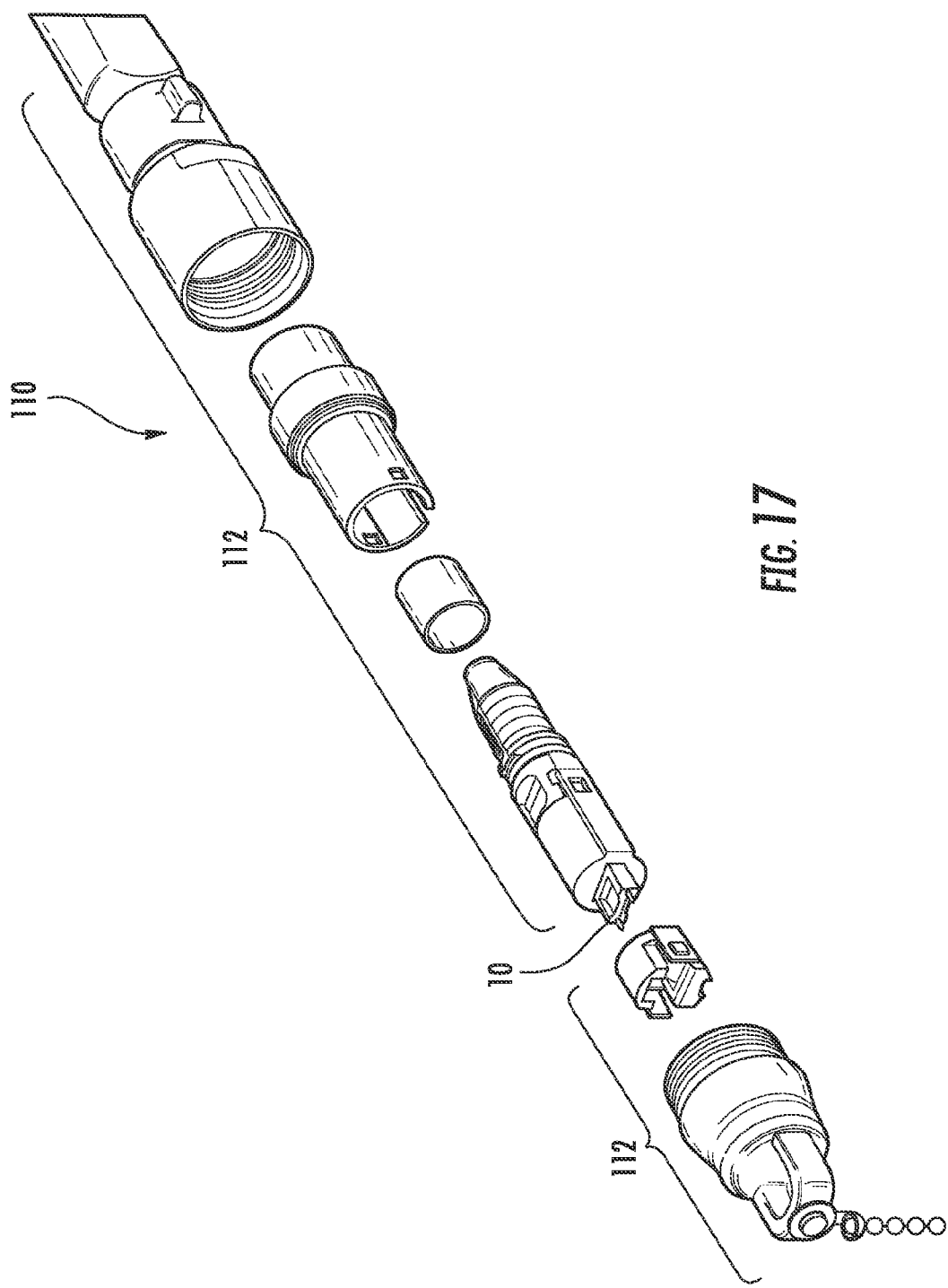
FIG. 17 is a perspective exploded view of an example optical fiber connector that employs the multi-fiber tapered ferrule.

FIG. 17 is a perspective exploded view of an example optical fiber connector 100 that employs the multi-fiber ferrule 10 as described above. Multi-fiber connector 100 is an "MT" type connector available from Corning, Inc., Corning, N.Y., and includes a number of connector-housing elements 112 that form connector housing 110 that at least partially surrounds single-fiber ferrule 10. Other types of multi-fiber connectors 100 can also be so formed. An example multi-fiber connector 100 is disclosed in U.S. Patent Application Serial No. 2007/0025665, which patent application is incorporated by reference herein.

Method of Making the Ferrule Using a Mold Process

An example method of making ferrule 10 involves molding the aforementioned thermoplastic and/or thermoset molding compound to have a desired outside shape as well as the desired tapered configuration for the one or more fiber channels 30. The process for making a single-fiber ferrule 10 is essentially the same as making a multi-fiber ferrule 10, so the process is discussed below in connection with forming a multi-fiber ferrule by way of illustration.

Figure 18:
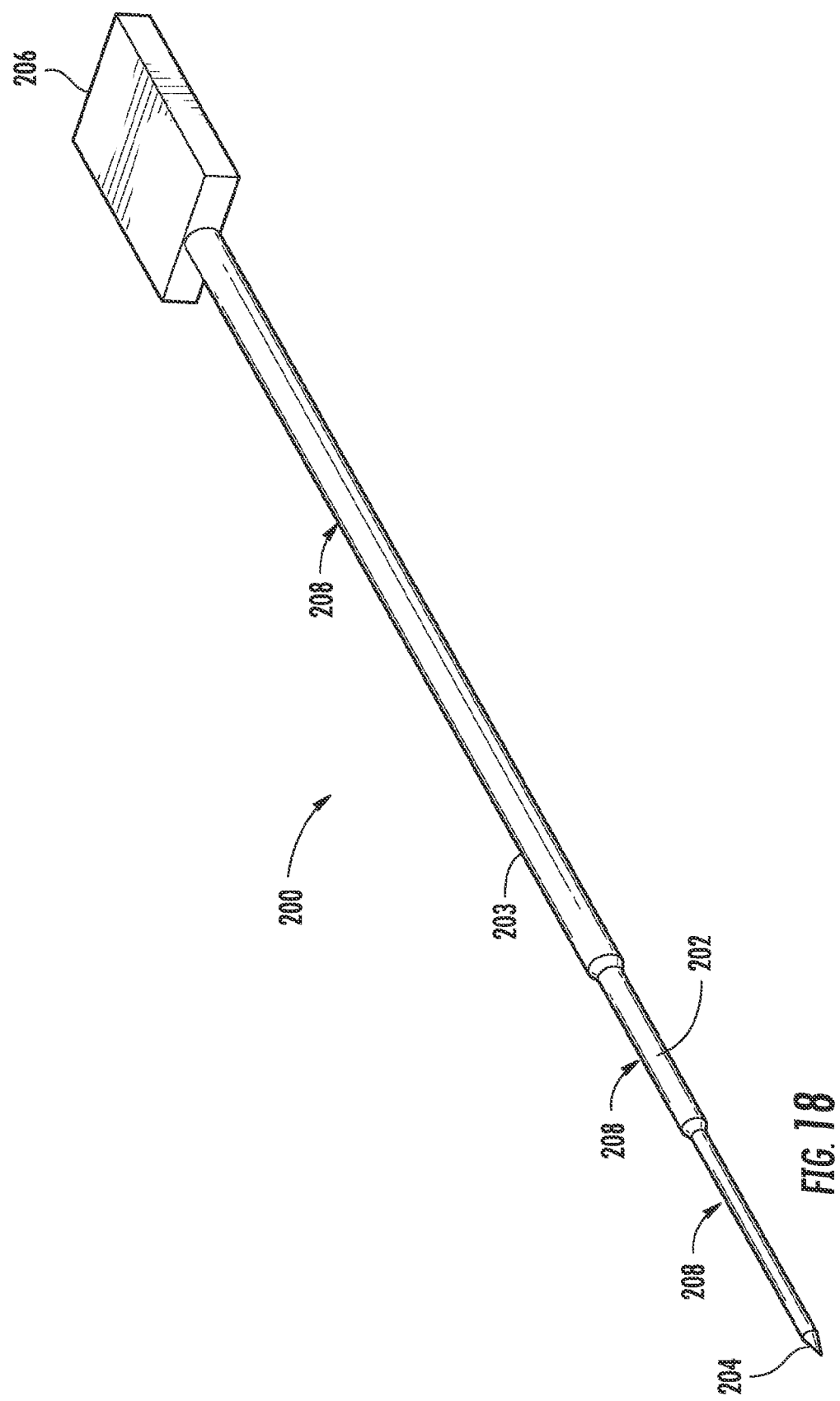
FIG. 18 is a perspective view of a tapered pin used to form a molded ferrule with at least one tapered channel, with the pin having a profile corresponding to the desired profile for the corresponding at least one fiber channel.

FIG. 18 is a perspective view of tapered pin 200 that has a profile corresponding to a desired profile for one or more fiber channels 30. Tapered pin 200 includes a pin body 202 with an outer surface 203, a front end 204, a back end 206 and one or more pin sections 208, which may be straight, curved or linearly sloped, as described above in connection with different types of tapered fiber channels 30. In an example embodiment, front end 204 comes to a sharp point and back end 206 is formed as a flat section to facilitate removal of tapered pin 200 from a mold, as discussed below. Example materials for forming pins 200 include carbide and steel.

Figure 19:
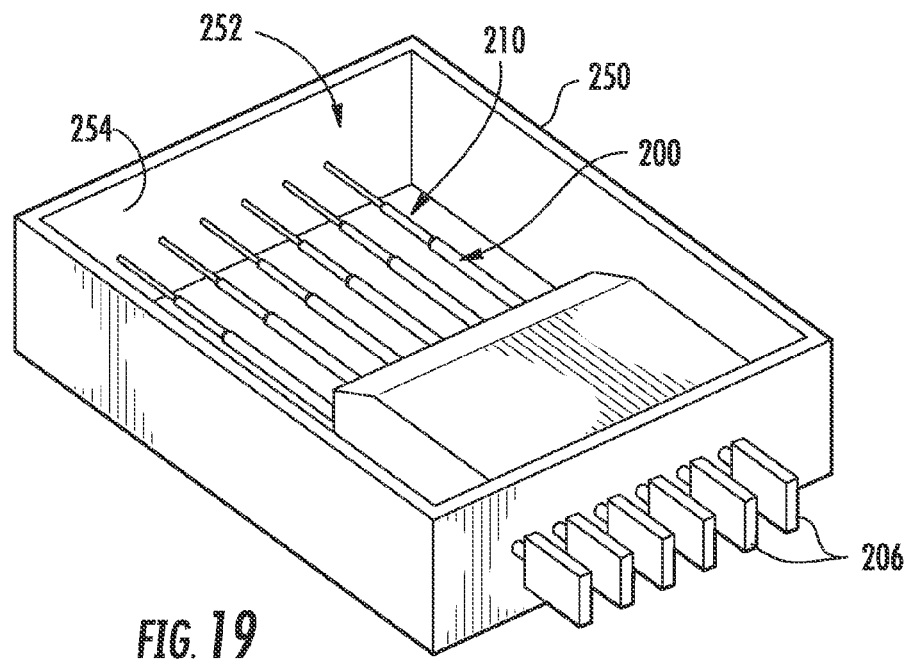
FIG. 19 is perspective view a ferrule mold with an array of tapered pins extending through the mold cavity.

FIG. 19 is a perspective view a mold 250 having an open mold cavity 252 defined by an interior surface 254 that corresponds in shape to the outside surface of a desired multifiber ferrule 10, such as the MTP type ferrule shown in FIG. 15. An array 210 of tapered pins 200 is arranged parallel to each other and relative to mold 250 so that the one or more pin sections 208 extend through mold cavity 252.

Figure 20:
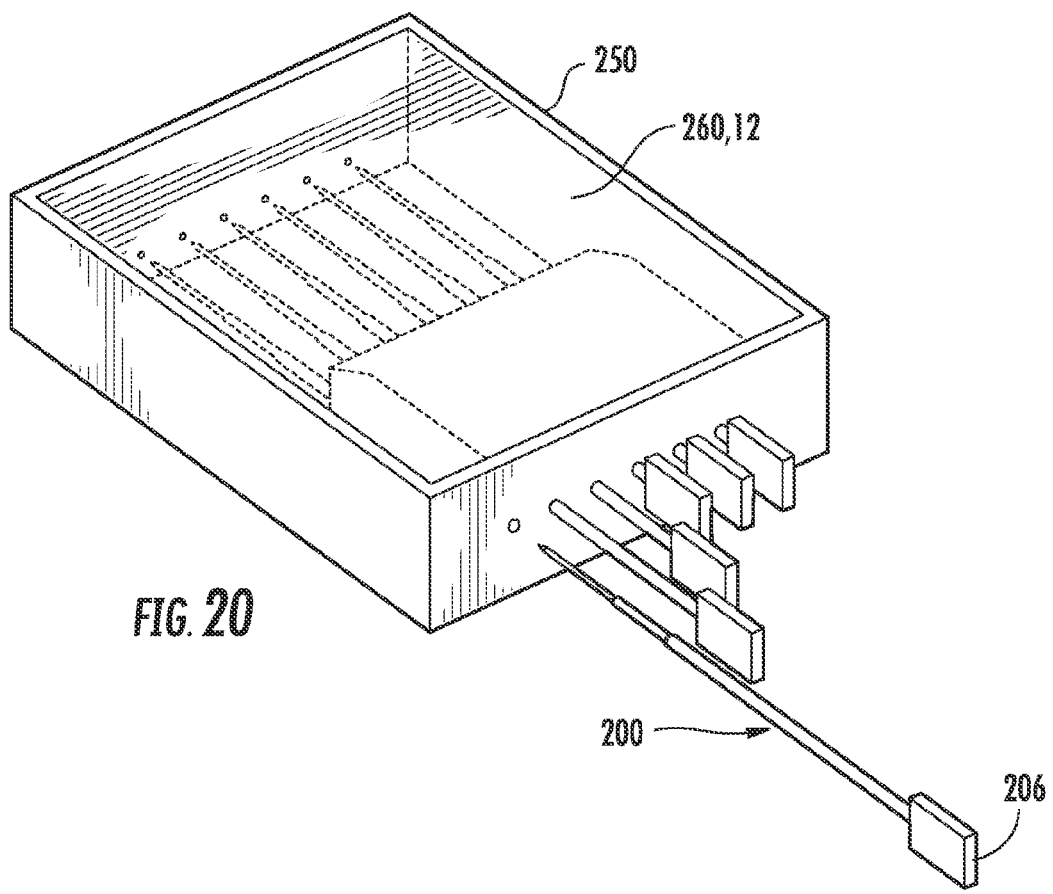
FIG. 20 is similar to FIG. 19, but with a molding compound having been added to the mold cavity.

FIG. 20 is similar to FIG. 19 but shows a molding compound 260 having been added to mold cavity 252 to surround tapered pins 200. As discussed above, in an example embodiment molding compound 260 comprises at least one of a thermoplastic material and a thermoset material. Molding compound 260 is allowed to cure, thereby forming ferrule body 12. Pins 200 are then extracted from the molded ferrule body 12, thereby leaving tapered fiber channels 30 within the ferrule body.

Figure 21:
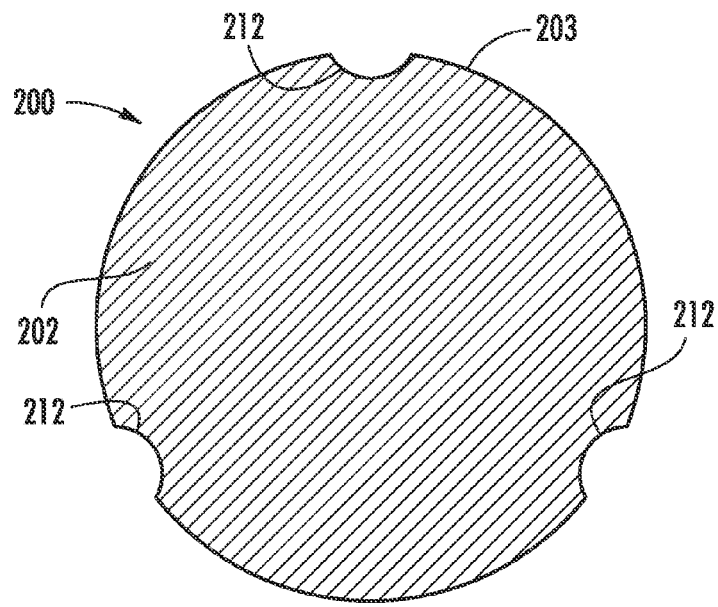
FIG. 21 illustrates a cross-sectional view of the front-end section of an example tapered pin that includes three radial indents in the outer surface.
Figure 22:
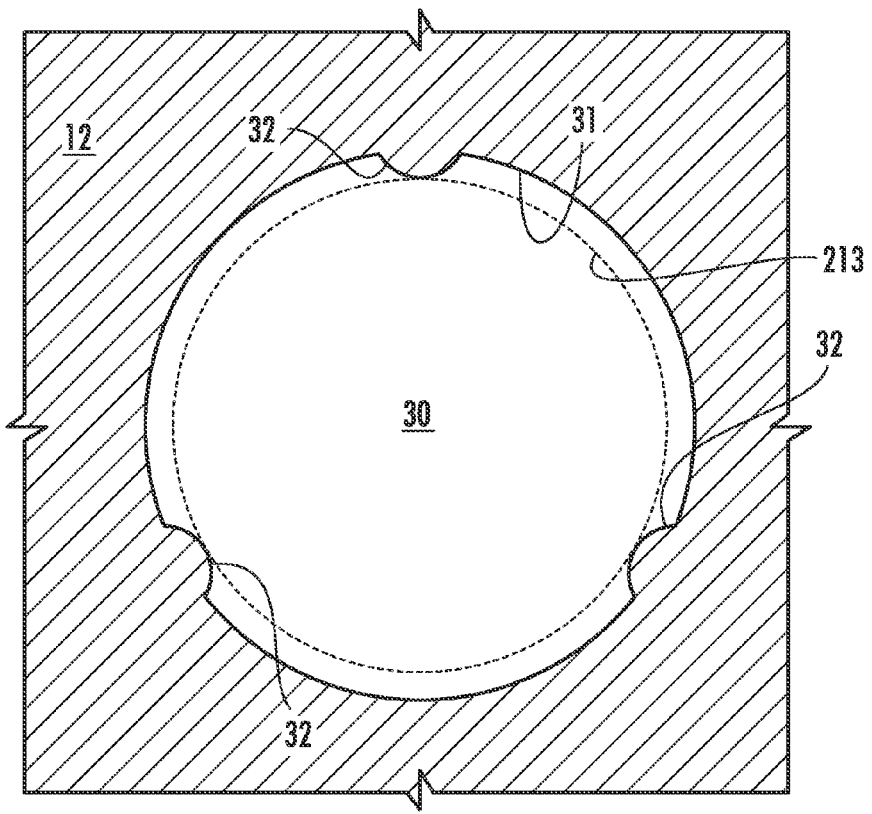
FIG. 22 is a cross-sectional view of an example ferrule fiber channel formed by the tapered pin of FIG. 21, showing three protrusions in the channel walls formed during the molding process.

FIG. 21 illustrates a cross-sectional view of an example front-end section 38 of tapered pin 200 that includes three radial indents 212 in outer surface 203. During the molding process, the thermoplastic or thermoset molding compound 260 fills indents 212, resulting in the formation of protrusions 32 in channels walls 31 of fiber channel 30, as shown in FIG. 22. Protrusions 32 are thus made of the same deformable and removable material as ferrule body 12. In an example embodiment, the diameter associated with fiber channel 30 is 0.1265 mm while the "diameter" of the imaginary circle 213 (dashed line) that touches indents 212 is 0.1250 mm. Thus, protrusions 32 define a second internal diameter. While three protrusions 32 are shown in FIG. 22, various different configurations for one or more protrusions are contemplated.

Figure 23:
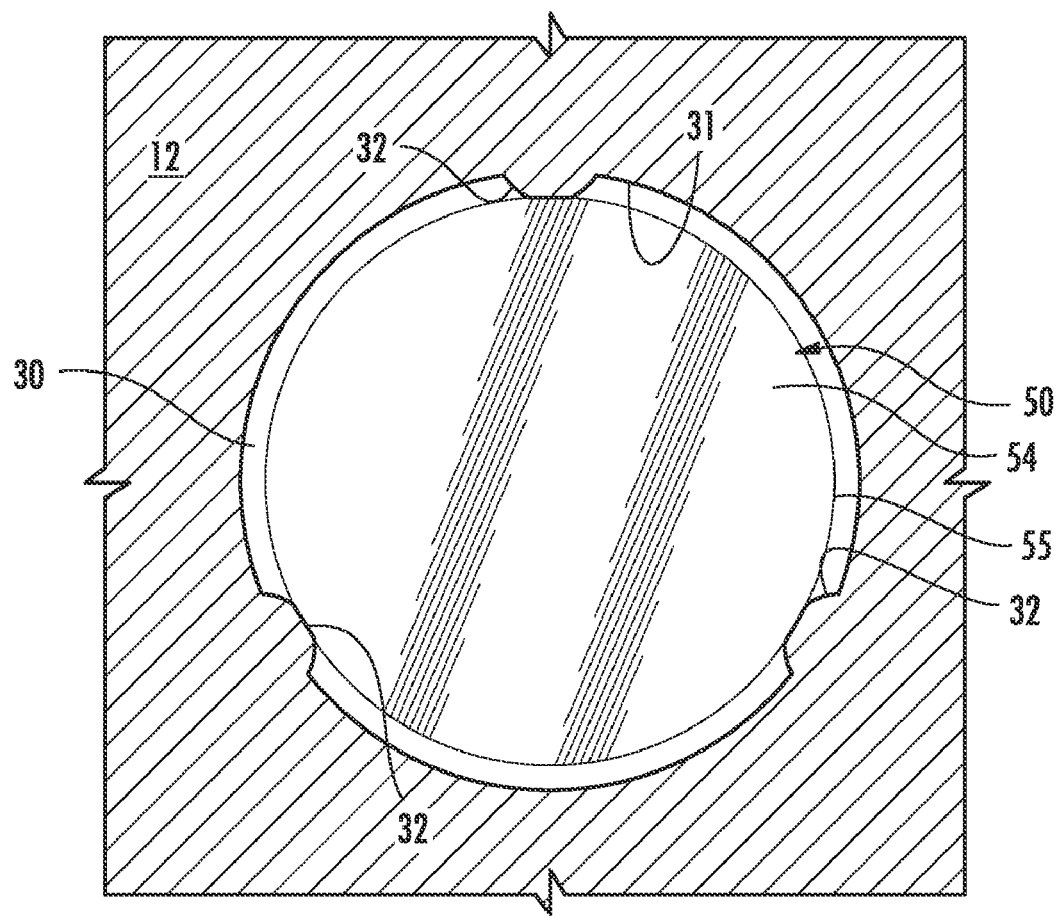
FIG. 23 is similar to FIG. 22 and shows an optical fiber tightly held within the fiber channel by the three channel wall protrusions after having removed a portion of the material from each of the protrusions.

In one example embodiment, when fiber 50 is inserted into channel 30, protrusions 32 deform, thereby forming a tight fit of the fiber within channel 30. In another example embodiment, outer edge 55 of fiber end 54 removes material from protrusions 32, thereby forming a tight fit of the fiber within channel 30. FIG. 23 is similar to FIG. 22 and shows an optical fiber 50 tightly held within the fiber channel by the three channel wall protrusions 32, whereby material has been removed from each protrusion by optical fiber outer edge 55 when the optical fiber was inserted with force into fiber channel 30.

It will be apparent to those skilled in the art that various modifications and variations can be made to the present disclosure without departing from the spirit and scope of the disclosure. Thus, it is intended that the present disclosure cover the modifications and variations of this disclosure, provided they come within the scope of the appended claims and their equivalents.

We claim:

1. A method of forming a ferrule that supports at least one optical fiber having an end, comprising:
   providing a ferrule mold having a cavity;
   inserting at least one tapered pin within the cavity, wherein the tapered pin has an outside shape that corresponds to a desired tapered fiber channel;
   adding a molding material to the mold cavity to cover the at least one tapered pin;
   allowing the molding material to cure to form a ferrule body around the at least one tapered pin, wherein the ferrule body is at least one of deformable and removable by contact by the optical fiber;
   removing the at least one tapered pin from the cured molding material to form at least one tapered channel having a smaller front end and a larger back end, wherein the at least one fiber channel includes a wall;
   inserting at least one optical fiber with an end into the respective at least one ferrule channel at the backend, wherein the optical fiber end has an outer edge and has a diameter larger than the fiber channel front end; and
   removing material from the fiber channel wall with the optical fiber edge to form an interference fit between the optical fiber end and the fiber channel front end.

2. The method of claim 1, further comprising:
   arranging a plurality of tapered pins within the cavity; and
   removing the array of tapered pins from the cured molding material to form a plurality of tapered channels.

3. The method of claim 1, further comprising:
   providing the at least one tapered pin with at least one indent so that the at least one tapered channel has at least one protrusion that is also at least one of deformable and removable by contact by the optical fiber.

4. The method of claim 3, wherein the at least one indent is formed in an end section of the at least one tapered pin, wherein the end section is untapered.

5. The method of claim 1, wherein the at least one fiber channel includes a wall, and further comprising:
   inserting at least one optical fiber with an end into the respective at least one ferrule channel at the back end, wherein the optical fiber end is larger than the fiber channel front end; and
   deforming the fiber channel wall with the optical fiber to form an interference fit between the optical fiber end and the fiber channel front end.

6. The method of claim 5, wherein the channel front end has a diameter $D_{34}$, the fiber end has a diameter $D_{54}$, wherein $\Delta D(\%)=100*(D_{54}-D_{34})/D_{54}$ is in the range $0 \leq \Delta D(\%) \leq 1\%$.

7. The method of claim 1, wherein the channel front end has a diameter $D_{34}$, the fiber end has a diameter $D_{54}$, wherein $\Delta D(\%)=100*(D_{54}-D_{34})/D_{54}$ is in the range $0 \leq \Delta D(\%) \leq 1\%$.

8. The method of claim 1, including forming the molding material from at least one of a thermoplastic material and thermoset material.

* * * * *